United States Patent
Lee et al.

(10) Patent No.: US 9,940,527 B2
(45) Date of Patent: Apr. 10, 2018

(54) DRIVING ASSIST SYSTEM FOR VEHICLE AND METHOD THEREOF

(71) Applicant: Hyundai Mobis Co., Ltd., Seoul (KR)

(72) Inventors: Won oh Lee, Yongin-si (KR); Jung won Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 195 days.

(21) Appl. No.: 14/808,289

(22) Filed: Jul. 24, 2015

(65) Prior Publication Data
US 2016/0026880 A1   Jan. 28, 2016

(30) Foreign Application Priority Data

Jul. 28, 2014  (KR) .................. 10-2014-0095782
Dec. 4, 2014   (KR) .................. 10-2014-0172993

(51) Int. Cl.
*G06K 9/00*   (2006.01)
*H04N 7/18*   (2006.01)
(Continued)

(52) U.S. Cl.
CPC ..... *G06K 9/00798* (2013.01); *G06K 9/00201* (2013.01); *G06K 9/00791* (2013.01); *G06K 9/00805* (2013.01); *G06T 7/579* (2017.01); *G06T 7/70* (2017.01); *H04N 5/332* (2013.01); *H04N 7/183* (2013.01); *H04N 9/045* (2013.01);
(Continued)

(58) Field of Classification Search
None
See application file for complete search history.

(56) References Cited

U.S. PATENT DOCUMENTS 6,597,807 B1 * 7/2003 Watkins ............. G02B 27/2228
                                                    348/33
8,928,793 B2   1/2015 McMahon
(Continued)

FOREIGN PATENT DOCUMENTS

CN    2642588 Y    9/2004
CN  203691533 U   7/2014
(Continued)

OTHER PUBLICATIONS

Korean Office Action dated Dec. 18, 2015, in KR Patent Application No. 10-2014-0172993.
(Continued)

*Primary Examiner* — Sean Conner
(74) *Attorney, Agent, or Firm* — H.C. Park & Associates, PLC

(57) ABSTRACT

A driving assist system for a vehicle and a method thereof includes a broadband camera which photographs the surrounding area of the vehicle to create an image including four channels of light information having different wavelengths. The broadband image data and the position of the vehicle are matched so that a road and an obstacle are easily recognized using a minimal number of cameras while driving the vehicle. Recognition performance of a drivable area is significantly improved, navigation for the vehicle is easily measured, and the biometric recognizing abilities of a driver monitoring camera is improved, thereby improving the convenience of a driver by the improvement of a the performance of a driving assist device.

16 Claims, 20 Drawing Sheets

(51) Int. Cl.
*H04N 9/04* (2006.01)
*H04N 5/33* (2006.01)
*G06T 7/70* (2017.01)
*G06T 7/579* (2017.01)

(52) U.S. Cl.
CPC ............... *G06T 2207/10016* (2013.01); *G06T 2207/10024* (2013.01); *G06T 2207/10028* (2013.01); *G06T 2207/10048* (2013.01); *G06T 2207/30256* (2013.01); *G06T 2207/30261* (2013.01)

(56) References Cited

U.S. PATENT DOCUMENTS

| | | | |
|---|---|---|---|
| 9,253,397 B2 | 2/2016 | Lee et al. | |
| 2002/0154833 A1* | 10/2002 | Koch | G06K 9/4628 382/325 |
| 2004/0247157 A1* | 12/2004 | Lages | G06K 9/00805 382/103 |
| 2010/0020209 A1* | 1/2010 | Kim | H04N 3/155 348/294 |
| 2013/0177236 A1* | 7/2013 | Kim | G06K 9/00201 382/154 |
| 2013/0188051 A1* | 7/2013 | Ishigaki | G06K 9/00825 348/148 |
| 2013/0278726 A1* | 10/2013 | Muhammad | H04N 9/045 348/46 |
| 2013/0304374 A1* | 11/2013 | Lee | G01C 21/26 701/445 |
| 2015/0019098 A1* | 1/2015 | Schrabler | G01S 17/936 701/70 |
| 2017/0217383 A1* | 8/2017 | Bingle | B60R 11/04 |

FOREIGN PATENT DOCUMENTS

| | | |
|---|---|---|
| DE | 10-2009052868 A1 | 6/2010 |
| DE | 10-2012213294 A1 | 1/2014 |
| JP | 2011250376 A | 12/2011 |
| KR | 10-2013-0132128 | 12/2013 |
| KR | 10-2013-0136372 | 12/2013 |
| KR | 10-2014-0062801 | 5/2014 |

OTHER PUBLICATIONS

Korean Office Action dated Dec. 18, 2015, in KR Patent Application No. 10-2014-0172993 (with translation).
Chinese Office Action dated Apr. 12, 2017 in corresponding Chinese Appl No. 201510441656.1 (with unverified translation).

* cited by examiner

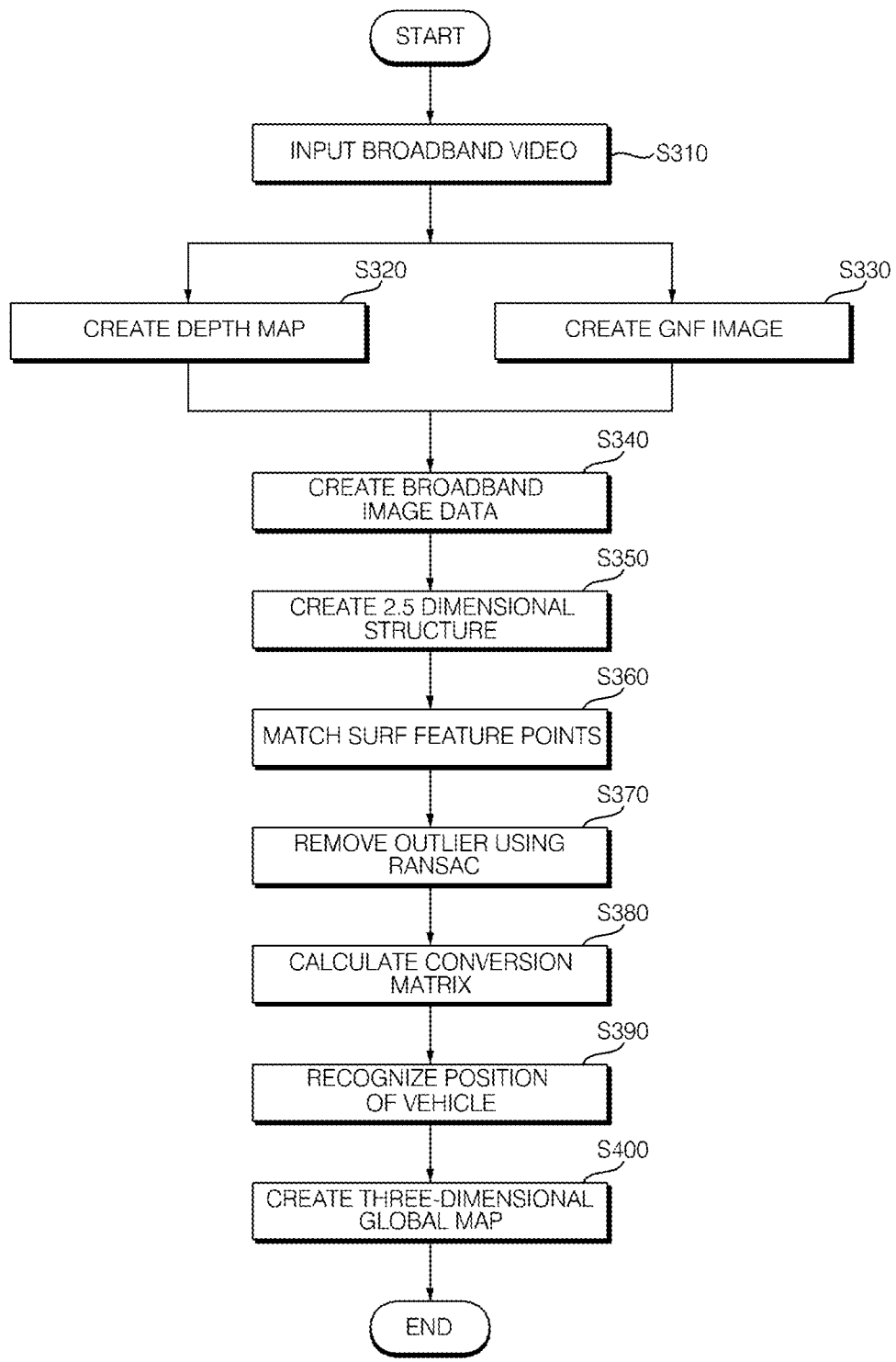

DRIVING ASSIST SYSTEM FOR VEHICLE AND METHOD THEREOF

CROSS-REFERENCE TO RELATED APPLICATIONS

The present application claims priority from and the benefit of Korean Patent Application No. 10-2014-0095782, filed on Jul. 28, 2014, and Korean Patent Application Number 10-2014-0172993, filed on Dec. 4, 2014, which are hereby incorporated by reference for all purposes as if fully set forth herein.

BACKGROUND

Field

Exemplary embodiments relate to a driving assist system for a vehicle and a method thereof. More particularly, exemplary embodiments relate to a driving assist system for a vehicle which may recognize spaces and driveways while the vehicle is being driven on a road and a method thereof.

Discussion of the Background

There is current a trend to mount a system in a vehicle which may assist and increase the convenience for a driver of the vehicle by providing information to the driver. One type of technology that may be provided to the driver recognizes the road within an area while the driver is moving. This technology has been implemented by various methods.

Generally, a device for collecting images using a photodiode, a device for collecting narrow band image data, and a device for extracting boundaries are utilized to assist the driver while driving.

However, such devices have limited processing ranges, so their utilization is limited. For example, such devices do not process bands outside normal visible light, such as light wavelengths under 400 nm and above 700 nm. As such, the range of recognized colors is narrow due to the limited bandwidth and resources used to extract boundaries and recognize objects are, therefore, limited.

Due to the limited resources for extracting boundaries and recognizing objects, even though an excellent post-processing algorithm may be applied, recogniziation performance is restricted due to limited color space data, which acts as disadvantage for a road driving environment. Since the road driving environment is generally achromatic, when the visible ray processing region is limited, space recognizing ability may also be limited. Thus, when a road image is divided, the precision of dividing the asphalt part and the cement part may be very low.

A device which obtains three-dimensional space information has recently been made available. However, in the case of a three dimensional space information obtaining device of the related art, even though various sensors, such as a radar sensor, a TOF camera, a stereo camera, an infrared camera, an ultrasonic sensor, and a laser, which obtain three-dimensional space information may be mounted in the vehicle with a camera, cost is increased by using excessive various devices.

When combining RGB camera and three-dimensional space information, since pixel information between a depth map and an RGB camera is different, signal/image processing complexity is increased and a high quality algorithm is required. Therefore, software load may be increased, and real time processing may be difficult.

In the case of a vehicle, in which positions of the camera and the sensor may vary without being fixed, matching difficulty is further increased, so that a complex algorithm is required. Therefore, processing time thereof may be increased and precision may be significantly decreased.

Thus, there is a need for a system having a simple structure and improved precision.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a driving assist system for a vehicle which improves the space recognition of a broadband camera and efficiently extracts contours to recognize roads and objects in order to assist a driver to drive a vehicle and a method thereof.

Additional aspects will be set forth in the detailed description which follows, and, in part, will be apparent from the disclosure, or may be learned by practice of the inventive concept.

Exemplary embodiments provide a driving assist system for a vehicle. This system includes a broadband camera that photographs the area surrounding the vehicle to create an image, a map creating unit that creates a depth map based on the image from the broadband camera, an image creating unit that creates a green, near infrared, and far infrared ("GNF") image based on the image input from the broadband camera, and a broadband image creating unit that creates broadband image data for a three-dimensional map from the depth map and the GNF image.

The broadband camera may create an image including four channels of information such as green (G), 800 nm-band near infrared 1 (NIR1), 900 nm-band near infrared 2 (NIR2), and far infrared (FIR).

Another exemplary embodiment provides an operating method of a driving assist system for a vehicle, including: generating an image with one or more channels of information from a broadband camera; creating a depth map from the image based on channel information with a map creating unit; creating a GNF image from the image with an image creating unit; and combining the depth map and the GNF image to create broadband image data with a broadband image creating unit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 13 is a flowchart illustrating a three-dimensional global map creating method according to an exemplary embodiment.

DETAILED DESCRIPTION OF THE ILLUSTRATED EMBODIMENTS

Figure 1:
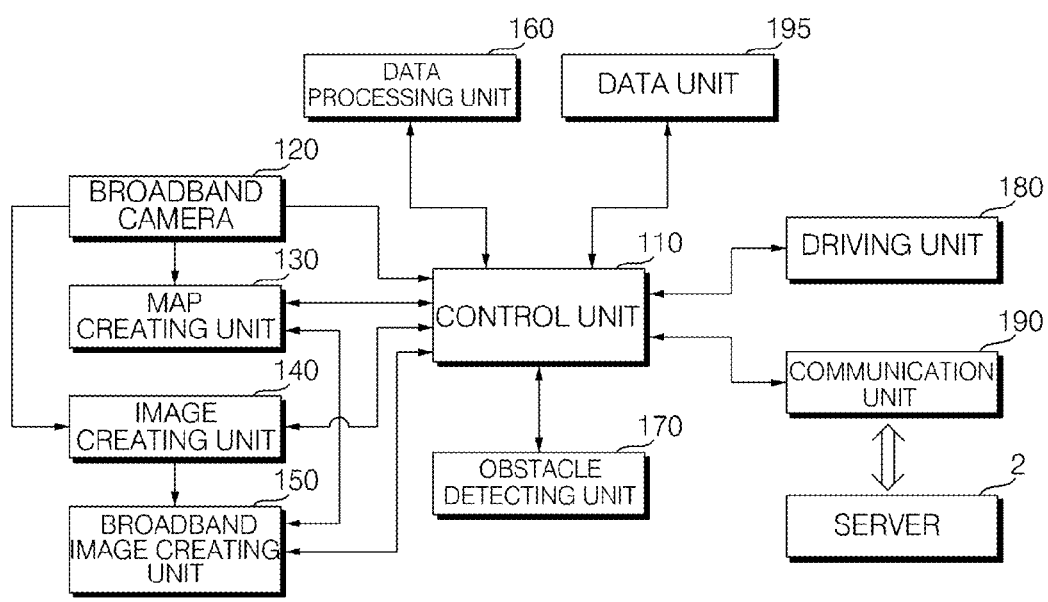
FIG. 1 is a block diagram illustrating a configuration of a driving assist system for a vehicle according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram illustrating a configuration of a driving assist system for a vehicle according to an exemplary embodiment of the present invention.

Referring to FIG. 1, a vehicle includes a broadband camera 120, a map creating unit 130, an image creating unit 140, a broadband image creating unit 150, a data processing unit 160, an obstacle detecting unit 170, a driving unit 180, a communication unit 190, a data unit 195, and a control unit 110 for controlling an overall operation of a vehicle.

The vehicle may include components such as an engine, a motor, and a transmission for driving the vehicle and may include a plurality of sensors, but the description thoseof will be omitted.

The vehicle may include an input unit (not illustrated) including a plurality of switches which inputs predetermined signals in response to a driver, an output unit (not illustrated)

which outputs information during the operation of an electric vehicle, and a manipulating unit for driving, such as a steering wheel, an accelerator, and/or a brake.

The input unit may also include switches or buttons for operation of a turn signal lamp, a tail lamp, a head lamp, etc.

The output unit may include a display unit which displays information, a speaker which outputs sound, an instrument panel, and various indicator lights. The output unit may output status information about the vehicle, such as speed, lamp status, etc. The output unit may output a warning when unusual vehicular situations occur and may also output a predetermined image through the display unit. The warning may be output as at least one of a warning sound, a voice warning, a warning light, a warning message, and a warning image.

In the data unit 195, driving data from the driving of a vehicle, reference data for determining erroneous operations in the vehicle, and data created while driving a vehicle, are stored. Images created using broadband camera 120, data created by processing the images, information regarding three-dimensional image data, and obstacles extracted from an image may also be stored in data unit 195.

The driving unit 180 controls each component of the vehicle to operate in accordance with input from the manipulating unit and a control command from the control unit 110 to move the vehicle, while being driven, in accordance with the manipulation of the driver. The driving unit 180 may directly control driving of components such as the engine, transmission, and brake, in accordance with the control command.

The communication unit 190 may include a plurality of communication modules to allow the vehicle to transmit and receive data to and from the outside. Specifically, the communication unit 190 communicates with a server 2 that provides information to the vehicle which is autonomously driven using a three-dimensional map.

The control unit 110 may control a predetermined lamp to be turned on or turned off in accordance with switch manipulation of the input unit, a turn signal lamp to be turned on and turned off, and a vehicle speed to accelerate or decelerate the vehicle in accordance with the operation of the accelerator or the brake, etc. Further, the control unit 110 may detect the erroneous operation of the vehicle and may output a warning in accordance with the erroneous operation through the output unit.

The broadband camera 120 photographs surroundings of the vehicle to generate an image. The broadband camera 120 may include a wide-angle lens. Further, the broadband camera 120 may input a image including four channel color information.

The map creating unit 130 may analyze the image input from the broadband camera 120 to create a depth map.

The image creating unit 140 may analyze the image input from the broadband camera 120 to create a GNF image.

The broadband image creating unit 150 may analyze the data of the map creating unit 130 and the data of the image creating unit 140 to create a three-dimensional map template.

The data processing unit 160 may analyze the broadband camera 120 to create a 2.5 dimensional structure. In this case, the data processing unit 160 may determine the position of the vehicle based on the 2.5 dimensional structure to match the position on a three-dimensional map.

The obstacle detecting unit 170 may analyze the image input from the broadband camera 120 to detect an obstacle.

The control unit 110 controls the driving unit 180 to drive a vehicle based on a created three-dimensional map. The control unit 110 transmits the created data to the server 2 through the communication unit 190 and receives position information or data on a three-dimensional map from the server 2 and applies a control command to the driving unit 180 to drive the vehicle.

Creation of a three-dimensional map will be described below in detail with reference to FIG. 2.

Figure 2:
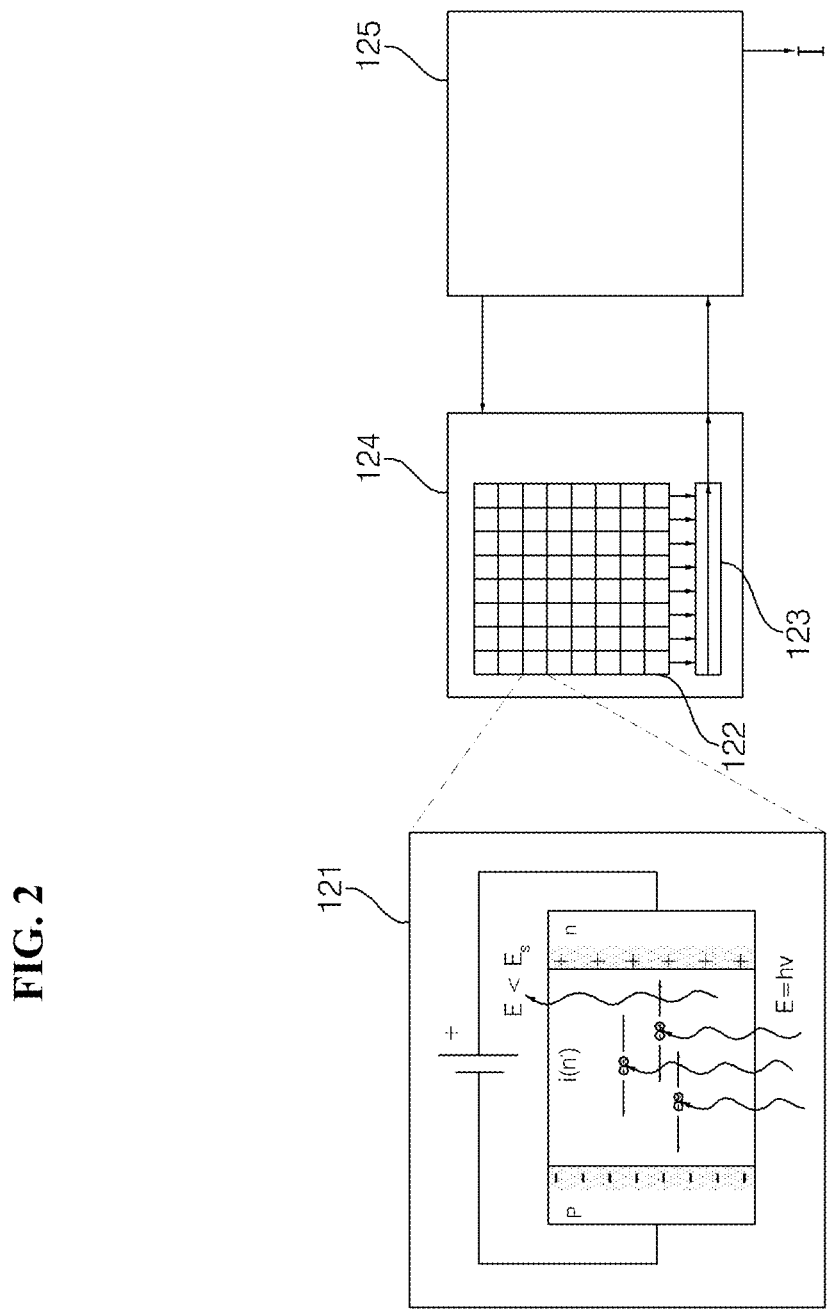
FIG. 2 is a block diagram illustrating a configuration of a camera of a driving assist system for a vehicle according to an exemplary embodiment.

FIG. 2 is a block diagram illustrating a configuration of a broadband camera of a driving assist system for a vehicle according to an exemplary embodiment of the present invention.

As exemplified in FIG. 2, the broadband camera 120 provided in the vehicle includes an image sensor (such as a charged coupling device (CCD)) 124 and a image processing unit 125. The image sensor 124 is configured to include a plurality of pixels 121.

In the pixel 121, as illustrated in FIG. 2, when light having a predetermined frequency or higher is incident, the photoelectric effect in the photoelectron located in a conductor of the pixel is emitted.

The photoelectron generated in each pixel 121 is converted into a signal having a predetermined level of voltage by a converting unit 123 in the image sensor, as illustrated in FIG. 2.

In this case, a transmissive band filter is applied to the image sensor 124 to determine color. The image sensor 124 determines the color by a green, near infrared 1, near infrared 2, and far infrared ("GN1N2F") signal processing method based on about four channels of information, such as green (G), a 800 nm-band near infrared 1 (NIR1), a 900 nm-band near infrared 2 (NIR2), and far infrared (FIR), rather than using a RGB filter method used in comparative examples.

A color signal of the image sensor 124 and a voltage signal of the pixel are input into the image processing unit 125.

The image processing unit 125 processes a signal for each pixel to be configured by an image frame, and outputs image data I configured by a plurality of image frames. For example, the image I may be a broadband image in which data on non-visible rays are loaded in addition to visible rays. Thus, the output image data may have a frequency band of 300 to 1100 nm.

Since the broadband camera 120 may obtain a broadband spectral image which exceeds a visual limit of human, when the broadband camera 120 is used as a camera for a driving vehicle, the image I is used to improve performance for recognizing a road, an obstacle, and other vehicles.

Figure 3:
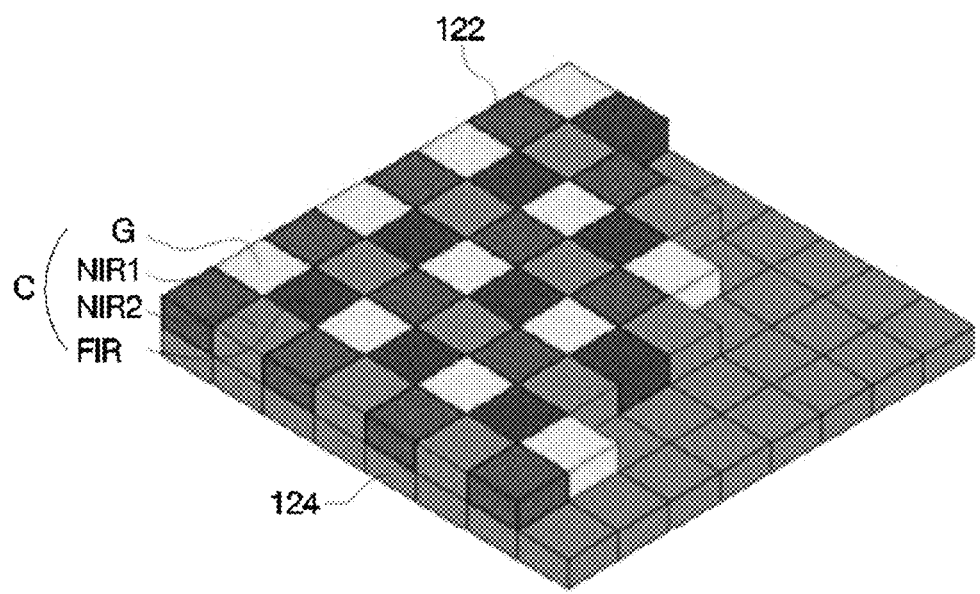
FIG. 3 is a view conceptually illustrating a structure of a light receiving element according to an exemplary embodiment.

FIG. 3 is a view conceptually illustrating a structure of a light receiving element which is provided in the broadband camera 120 of FIG. 2. As illustrated in FIG. 3, a light receiving filter 122 is applied to the image sensor 124.

The light receiving filter 122 filters incident light to selectively transmit the incident light, which may include non-visible rays and/or visible rays. That is, broadband light is transmitted by the light receiving filter 122.

As described above, the color is determined by the light receiving filter 122 and thus four channel color information may be obtained.

Light receiving filter 122 is formed such that a plurality of clusters C is repeatedly arranged. One cluster C includes four filters, that is, a G filter G, an NIR1 filter NIR1, an NIR2 filter NIR2, and a FIR filter FIR.

The G filter G is a filter for transmitting a green light component among visible ray components, the NIR1 filter NIR1 is a filter for transmitting a near infrared ray-1 of 800 nm band, the NIR2 filter is a filter for transmitting a near infrared ray-2 of 900 nm band, and the FIR filter is a filter for transmitting far infrared ray.

In exemplary embodiments, the green light component is a visible ray and the NIR1, NR2, and FIR rays are non-visible rays. Green is generally considered to be the light most sensitive to the visual receptors of humans, and thus green light is among the visible rays is transmitted.

However, embodiments are not limited thereto. For example, the filter may be configured such that visible rays having a wavelength other than green light is transmitted. Additionally or alternatively, instead of the near infrared ray filter, an ultraviolet UV filter may be included for transmitting UV rays.

As described above, the image sensor 124 to which the light receiving filter 122 illustrated in FIG. 3 is applied may detect not only the green light (G) component, but also the non-visible rays such as the near infrared rays (NIR1 and NIR2) and infrared ray (far infrared ray FIR).

With regard to clusters C described above, the arrangement and structure of the light receiving filter is one that is commercially available, but may also be modified.

FIGS. 4A, 4B, 5, 6A, 6B, and 6C are views referring to explain a road recognizing method using the camera of FIG. 2.

Figure 4A:
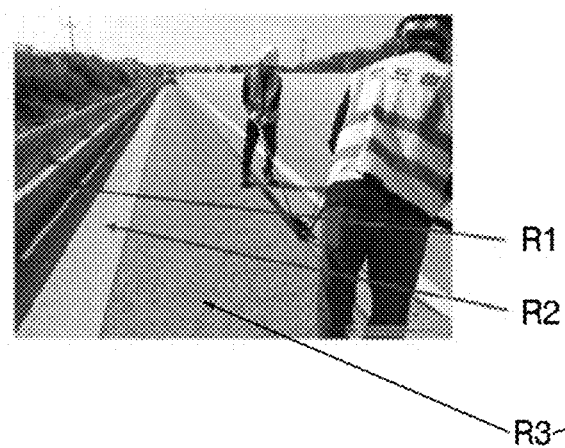
FIGS. 4A and 4B are views illustrating an old road and a new road interpreted using a road recognizing method using a camera of FIG. 2.
Figure 4B:
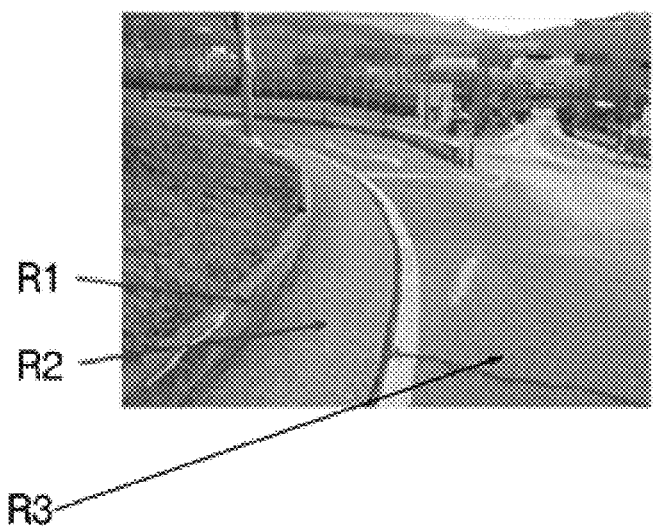

When compared with an old road illustrated in FIG. 4B, in a new road which is illustrated in FIG. 4A reflectance of asphalt is different from reflectance of concrete. In the case of the old road, the reflectance of the asphalt is close to the reflectance of the concrete, so that it may be difficult to distinguish the asphalt and the concrete by a visible ray. Therefore, when the normal camera of a comparative example is used, it is difficult to distinguish asphalt R3, a curb R1, and a gutter R2 of the old road.

Figure 5:
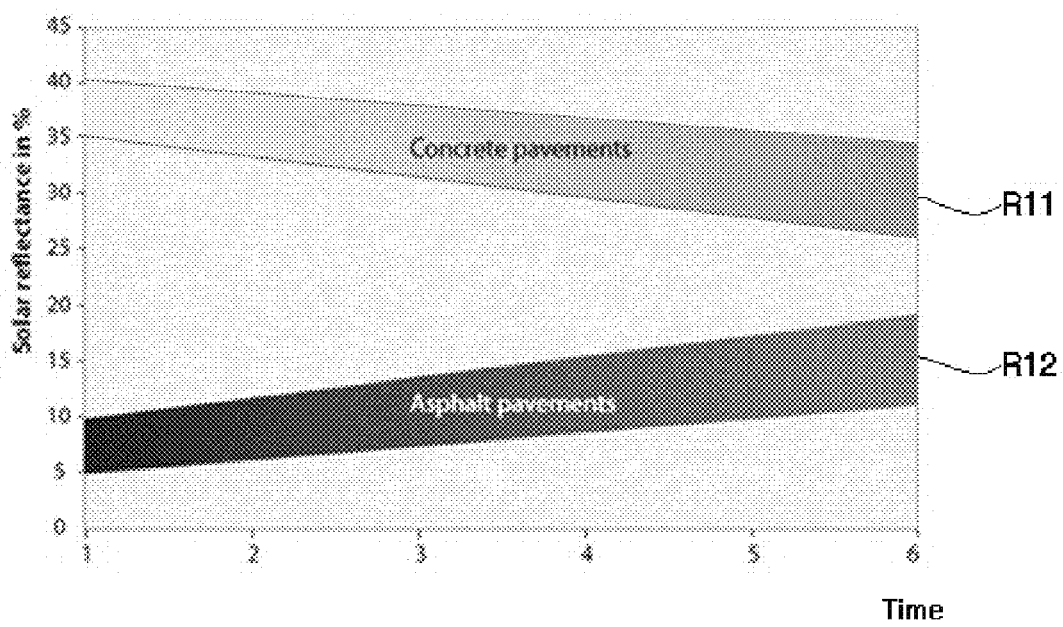
FIG. 5 is a graph illustrating characteristics of various road materials shown in FIGS. 4A and 4B.

This is because in the visible ray band, a characteristic curb R12 for the asphalt is similar to a characteristic curb R11 for the concrete, as illustrated in FIG. 5.

Figure 6A:
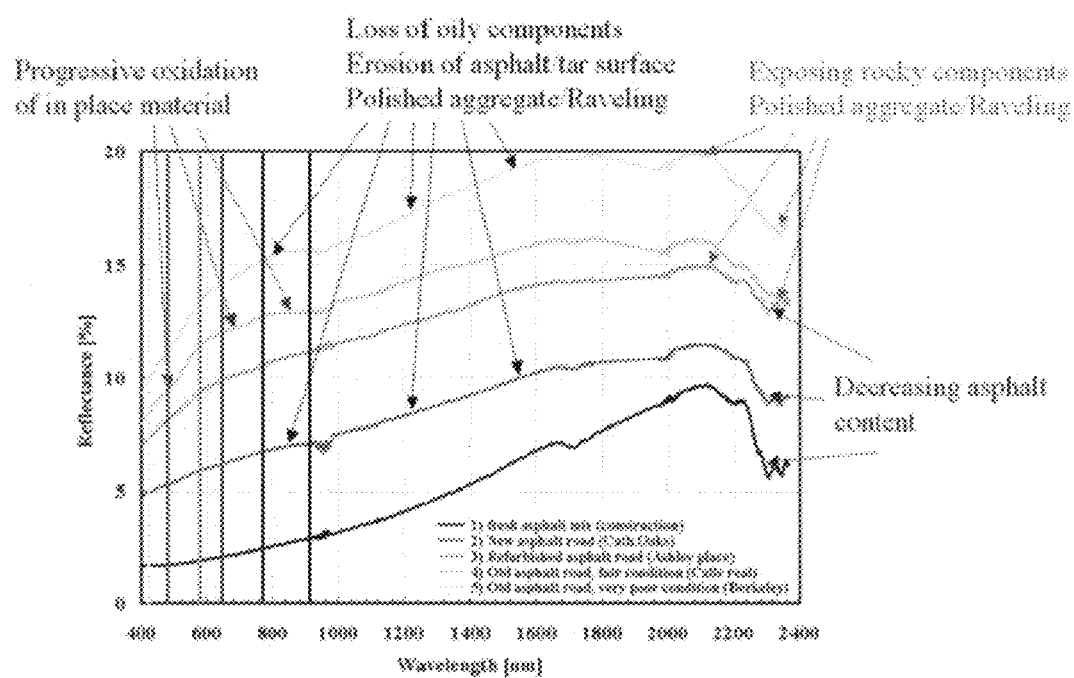
FIGS. 6A, 6B, and 6C are graphs showing reflectance of various materials at different wavelengths.
Figure 6B:
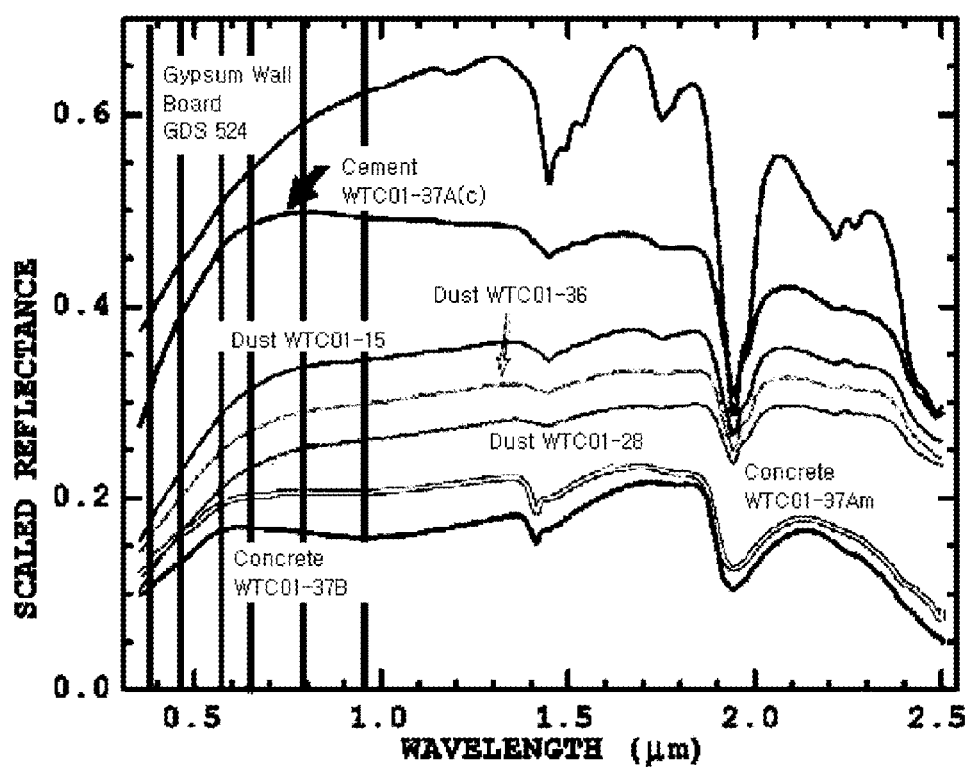
Figure 6C:
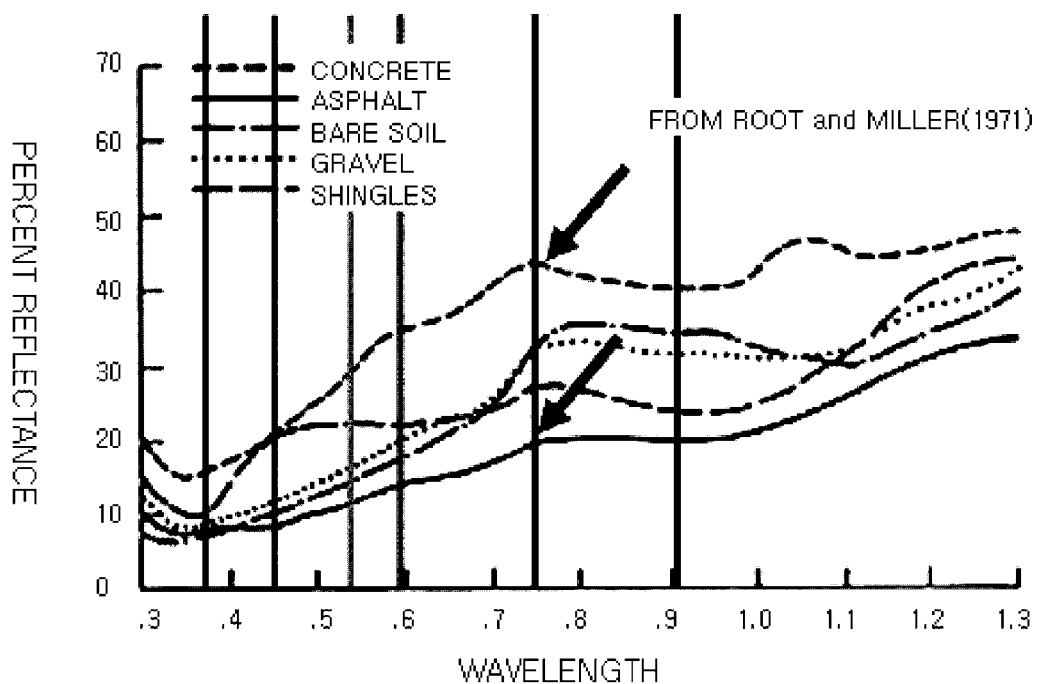

However, as illustrated in FIGS. 6A, 6B, and 6C, in a near infrared ray NIR band, gradients of band characteristic graphs for asphalt and concrete are different from each other, so that when image data of the road is obtained using the broadband camera 120, the asphalt R3, the curb R1, and the gutter R2 may be distinguished in the old road. Therefore, the precision of automatic parking and automatic driving may be improved.

According to exemplary embodiments, even though it is assumed that the light receiving filter 122 transmits both the visible ray and the non-visible ray, the light receiving filter 122 may transmit only the non-visible ray excluding the visible ray. Further, even though it is described that the light receiving filter 122 transmits and receives infrared ray IR, the light receiving filter 122 may selectively transmit and receive ultraviolet ray UV. In an exemplary embodiment, the near infrared ray NIR and the far infrared ray FIR are distinguished to be transmitted and received, but the near infrared ray NIR and the far infrared ray FIR may be transmitted and received as infrared rays IR without being distinguished from each other. Further, two or more visible ray bands (wavelengths) may be transmitted and received. Also, when the number of visible rays transmitted and received is increased, the number of non-visible rays transmitted and received may be reduced.

When two broadband cameras 120 are provided in a stereo configuration, visible and non-visible rays of eight bands (wavelengths) may be detected.

Figure 7:
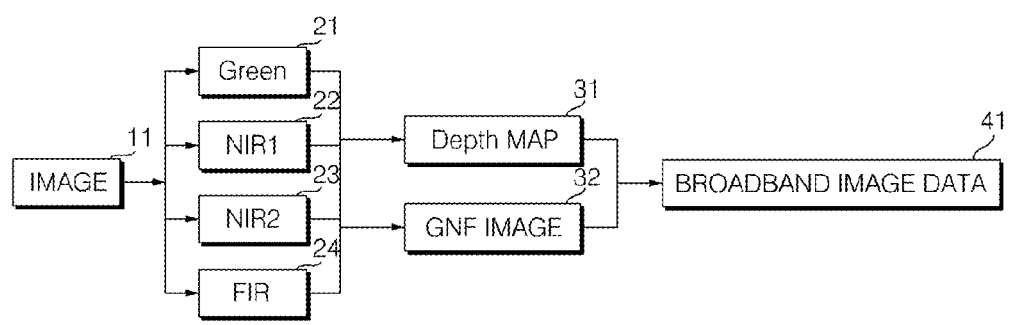
FIG. 7 is a view illustrating the flow of data when broadband image data is extracted during the image processing of a driving assist system for a vehicle according to an exemplary embodiment.

FIG. 7 is a view illustrating a flow of data when broadband image data is extracted during image processing of a driving assist system for a vehicle according to an exemplary embodiment of the present invention.

As illustrated in FIG. 7, the image 11 input through the image sensor 124 includes color information of four channels including green (G) 21, NIR1 22, NIR2 23, and FIR 24 channels in accordance with frequencies of light wavelengths by the light receiving filter 122 which is applied to the image sensor 124. The image data obtained by the broadband camera 120 may include four channel color information.

The color information which is divided as described above is used to generate a depth map 31 and a GNF image 32.

According to an exemplary embodiment, the map creating unit 130 determines the space information using the 800 nm-band NIR1 22 channel in the image data. Further, the map creating unit 130 may distinguish an object based on the color signal of the image data. Specifically, the map creating unit 130 may distinguish an object from the image using the color information from the green 21, NIR2 23, and/or FIR 24 channels. For example, asphalt and a curb may be distinguished from each other using color information from every channel. Further, since green 21, NIR2 23, and FIR 24 channels are used, the influence of fog and light reflections are small, so different regions are easily distinguished.

The broadband image creating unit 150 creates broadband image data 41 from the depth map 31 and the GNF image 32. The broadband image data is then combined with the position information of the vehicle to output a three-dimensional global map.

Figure 8A:
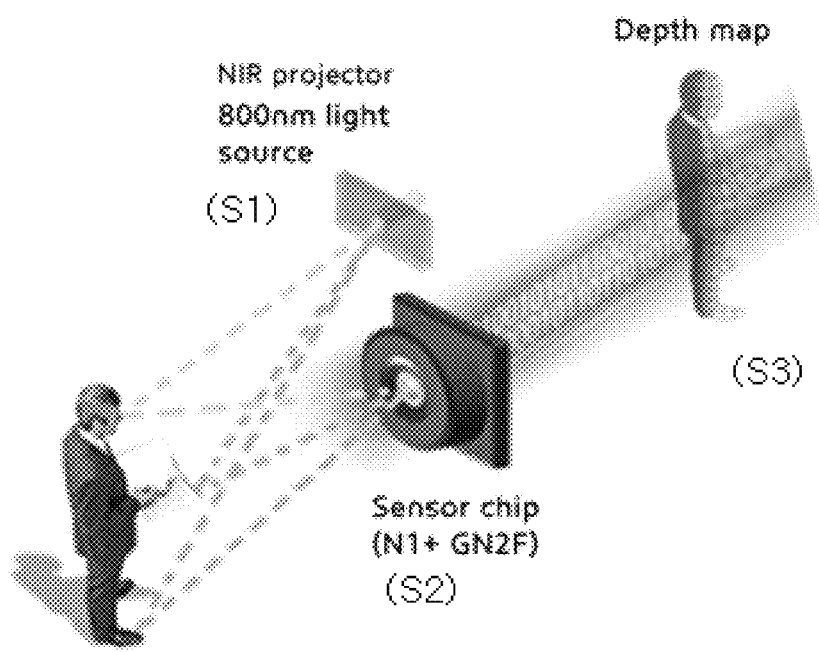
FIGS. 8A and 8B are a view explaining a method of extracting the broadband image data of FIG. 7.
Figure 8B:
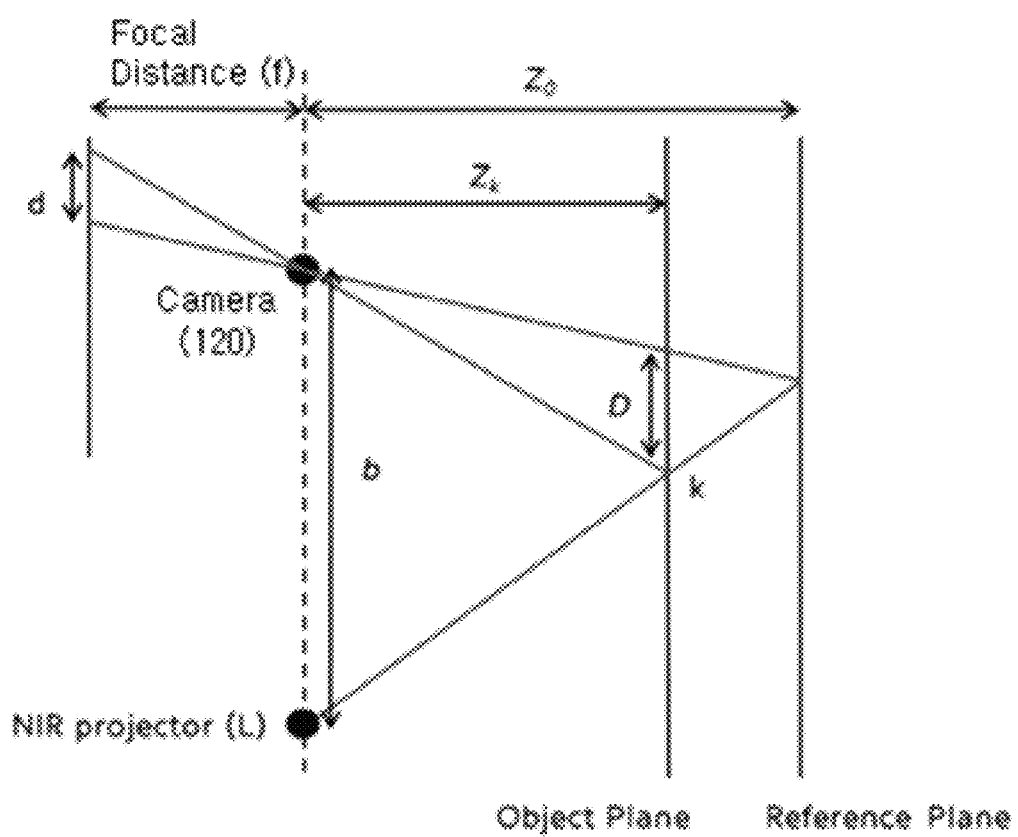

FIGS. 8A and 8B are a view explaining a method of extracting broadband image data of FIG. 7.

As illustrated in FIG. 8A, when the depth map 31 is created, the map creating unit 130 determines the space information using the image data created by the 800 nm-band NIR1 22 and an NIR projector.

The NIR projector outputs 800 nm-band infrared light in pixel unit bursts in step S1. In this case, when the infrared light reflected from the object is incident, the broadband camera 120 may accept the infrared light at the NIR1 22 channel in step S2. The map creating unit 130 may analyze a pattern for the infrared light which is received through the NIR1 channel to configure the depth map in step S3.

As illustrated in FIG. 8B, the map creating unit 130 may extract an infrared pattern which has been projected in a reference scene in advance and the control unit 110 stores the extracted infrared pattern in the data unit 195.

The map creating unit 130 may calculate depth information, with the infrared pattern reflected from an object plane and the time difference, based on a stored infrared pattern. The depth information may be calculated based on a trigonometric equation such as the following Equation 1 and Equation 2:

$$\frac{D}{b} = \frac{Z_0 - Z_k}{Z_0} \qquad \text{Equation 1}$$

$$\frac{d}{f} = \frac{D}{Z_k} \qquad \text{Equation 2}$$

Here, $Z_k$ is the distance from the broadband camera 120 at a point k, $Z_0$ is a value of a depth in the reference scene, b is a distance between the NIR projector L and the broadband camera 120, d is a time difference which is recorded in the image plane, and D is a shifted time difference of the point k in the object plane. In Equation 2, when D is substituted in Equation 1, the distance value $Z_k$ is expressed as represented in Equation 3 and is output as depth information.

$$Z_k = \frac{Z_0}{1 + \frac{Z_0}{f \cdot b} d} \quad \text{Equation 3}$$

In this case, when the depth map is created, since color information from the channels which were described above were used, the depth map and the image are matched with each other so that a three dimensional image may be created on the same optical axis. The map creating unit 130 creates the depth map from the calculated depth information while considering the movement of the broadband camera 120.

When the RGB filter in a comparative example is used, the depth map and the information of the RGB filter are not matched. Thus, in order to create the three-dimensional image, a complex algorithm may need to be applied and the processing time may be delayed due to the large computational load, and precision may be low.

However, as described above, according to exemplary embodiments, the image data obtained by the broadband camera 120 has information from four channels, including green (g) 21, NIR1 22, NIR2 23, and FIR 24, and a depth map is created on the same optical axis as the image, so the image data and the depth map are matched, and a three-dimensional broadband image data can easily be created.

Figure 9A:
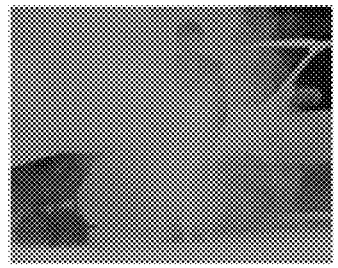
FIGS. 9A, 9B, 9C, 9D, 9E, 9F are exemplary view explaining image creation using signals having different wavelengths of FIG. 7.
Figure 9B:
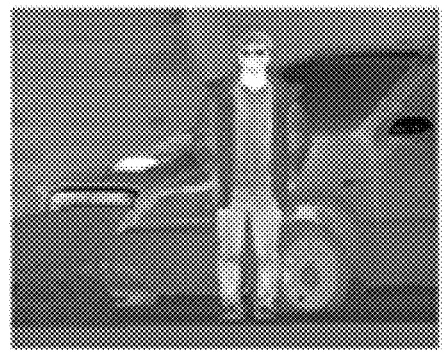
Figure 9C:
Figure 9D:
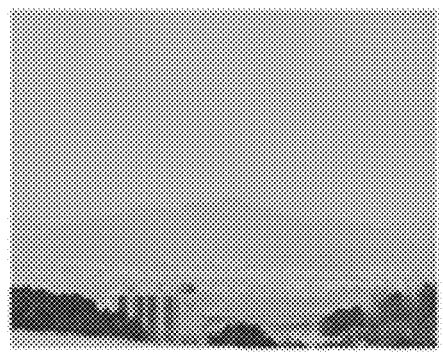
Figure 9E:
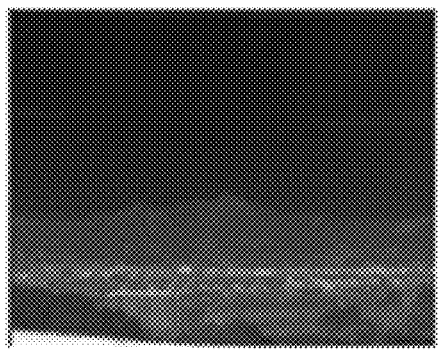
Figure 9F:

FIGS. 9A, 9B, 9C, 9D, 9E, and 9F are exemplary views explaining image creation using signals having different wavelengths of FIG. 7. In this case, FIGS. 9A and 9D are visible ray images, FIGS. 9B and 9E are far infrared images, and FIGS. 9C and 9F are images obtained by combining the visible ray and the far infrared images.

As illustrated in FIGS. 9A, 9B, 9C, 9D, 9E, and 9F, since the visible ray image, the far infrared light image, and near infrared light image have different wavelengths, information of the represented images is different from each other. The driving assist system for a vehicle according to the exemplary embodiment represents heat information, which is difficult to represent in the visible ray image due to the difference in wavelengths of the infrared light image.

In this exemplary embodiment, as described with reference to FIGS. 4A, 4B, and 5, the object, for example, reflectance of the asphalt, varies depending on the life span and reflectance of concrete varies depending on materials to be mixed. The driving assist system for a vehicle according to the exemplary embodiment of the present disclosure easily distinguishes the object in accordance with the wavelength in consideration of the difference described above.

Specifically, when the far infrared light image is used, objects may be more precisely detected despite changes in weather which may affect visible ray visibility, and objects which may be far away from the camera are more clearly photographed due to the long wavelength. Further, the near infrared light may more precisely distinguish regions which are hard to distinguish with visible rays, such as asphalt and the curb.

The image creating unit 140 combines the images of three wavelength bands which have been described above in the image data of the broadband camera 120 to create the GNF image.

The broadband image creating unit 150 combines the depth map and the GNF image which are input from the map creating unit 130 and the image creating unit 140 to create broadband image data for geographic feature information. The broadband image data is a three-dimensional map template and the three-dimensional map is created based thereon.

In this exemplary embodiment, the broadband image creating unit 150 highlights a contour of a two-dimensional GNF image using canny edge detection to distinguish a region of the object. Therefore, when the depth information is the same, like the curb and the asphalt, regions may be easily distinguished. However, other edge detection techniques are contemplated, and may be used additionally or alternatively.

Figure 10A:
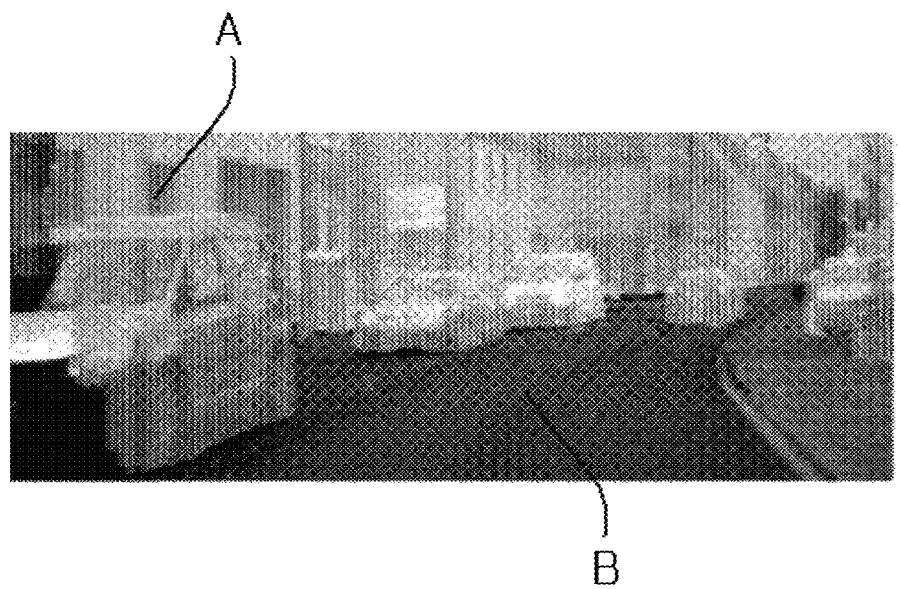
FIGS. 10A and 10B are illustrating an exemplary embodiment of detecting an obstacle by a driving assist system for a vehicle according to an exemplary embodiment.
Figure 10B:
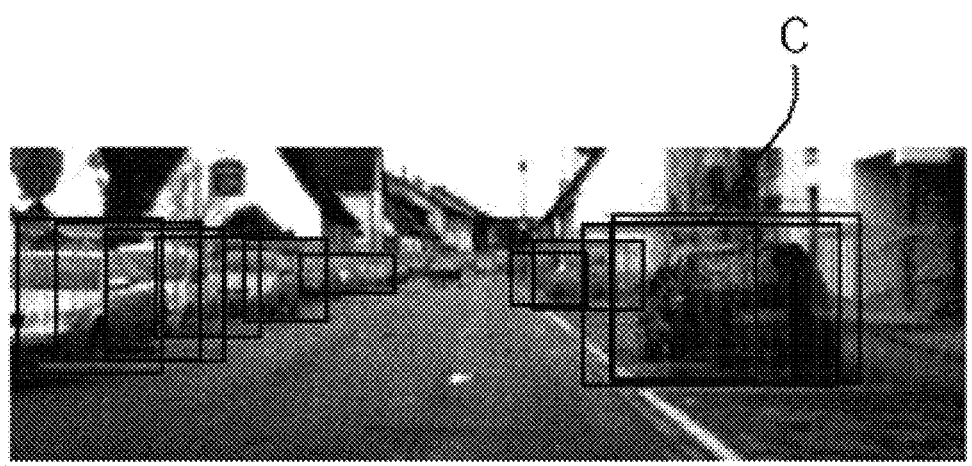

FIGS. 10A and 10B are views illustrating an exemplary embodiment of detecting an obstacle by a driving assist system for a vehicle according to an exemplary embodiment.

As described above, when the broadband image data is created, the broadband image data includes not only the appearance of the object, but also the distance information thereof, so that the obstacle detecting unit 170 recognizes the obstacle from the broadband image data based on the type of the object and the distance information.

As illustrated in FIG. 10A, the obstacle detecting unit 170 distinguishes the road region B and the obstacle region A in accordance with the distance information from the broadband image data.

In this exemplary embodiment, the obstacle detecting unit 170 models the object based on a cubic B-spline function with respect to the broadband image data and distinguishes the obstacle based thereon. In this exemplary embodiment, the obstacle is distinguished using the distance information.

The obstacle detecting unit 170 sets other regions excluding the road region B as an obstacle region A and distinguishes the obstacle only in the set obstacle region A. Since the obstacle detecting unit 170 does not distinguish the obstacle in the road region B, computational load is reduced.

As illustrated in FIG. 10B, the obstacle detecting unit 170 distinguishes the obstacle region and a part of the obstacle region may be set as interest region C.

Specifically, the obstacle detecting unit 170 may detect a vehicle from the obstacle region and reduce the interest region to be applied based on the obstacle and the road surface. Therefore, the obstacle detecting unit 170 may easily determine the obstacle in the interest region C. Further, as the interest region is reduced, the computational load of the obstacle detecting unit 170 is reduced, so that erroneous detection rates are reduced.

The obstacle detecting unit 170 determines whether movement in the interest region is an obstacle which may approach the vehicle.

Figure 11A:
FIGS. 11A, 11B, and 11C are a view illustrating an exemplary embodiment of detecting a pedestrian by a driving assist system for a vehicle according to an exemplary embodiment.
Figure 11B:
Figure 11C:

As illustrated in FIGS. 11A, 11B, and 11C, the obstacle detecting unit 170 detects an obstacle, specifically, a pedestrian using the brightness of the image, heat information, and depth information of the broadband image data, which may include four channels of information. However, obstacles are not limited to pedestrians and may include other obstacles that may approach the vehicle path.

As illustrated in FIG. 11A, the obstacle detecting unit 170 may use heat information to distinguish pedestrians based on a support vector machine (SVM) from a thermal image in accordance with a temperature of the pedestrian.

The obstacle detecting unit 170, as illustrated in FIG. 11B, may detect pedestrians based on a Haar classifier using the brightness information of the broadband image data. As illustrated in FIG. 11C, pedestrians may be also detected using depth information.

The obstacle detecting unit 170 combines pedestrian information to set a pedestrian region. Therefore, pedestrians are easily detected and precision is also improved.

Figure 12:
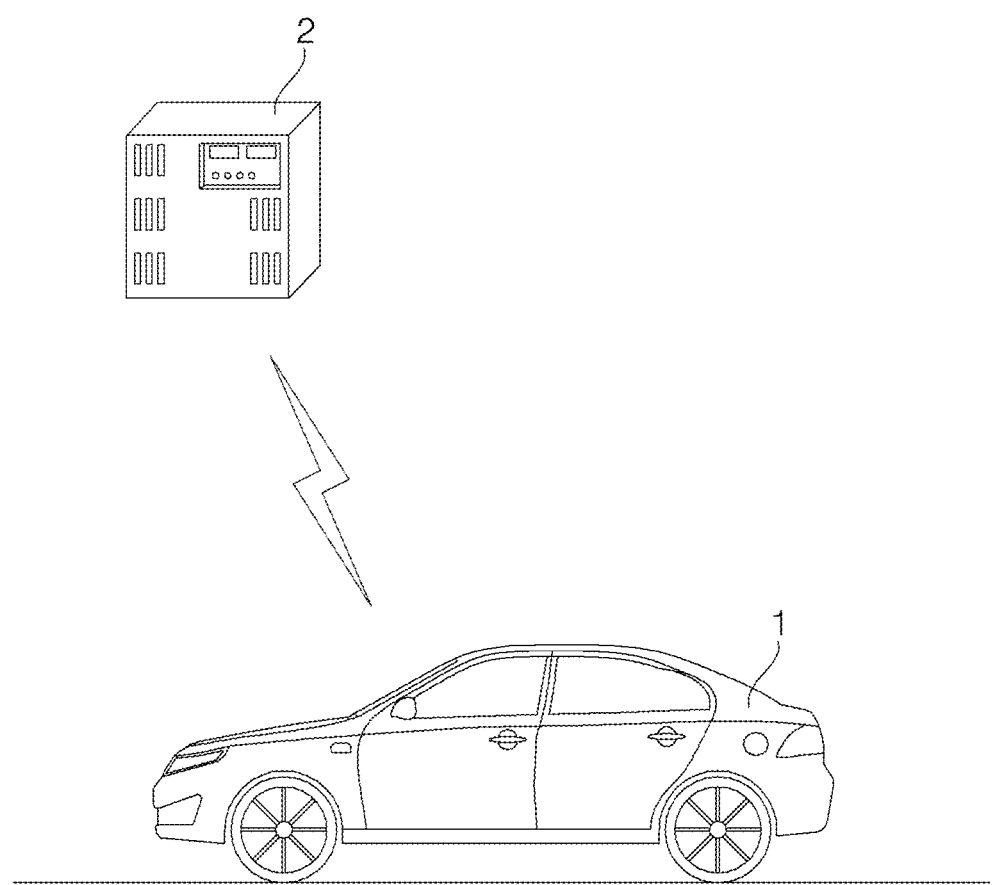
FIG. 12 is a view illustrating a configuration of a driving assist system for a vehicle according to an exemplary embodiment.

As illustrated in FIG. 12, the vehicle 1 transmits broadband image data which is created by the broadband image creating unit 150 to the server 2 and the server 2 receives and stores the broadband image data.

The server 2 provides three-dimensional map information to a plurality of vehicles based on the stored broadband image data, determines a position of the vehicle to match the position on the three-dimensional map and then provides the information.

In this exemplary embodiment, the control unit 110 of the vehicle 1 combines the GPS information based on a three-dimensional map of the broadband image data, including distance information and driving environmental information which are created by the broadband image creating unit 150, to control the driving unit 180 so that the vehicle is autonomously driven.

In this exemplary embodiment, the data processing unit 160 estimates the relative camera motion with respect to continuous image frames which are photographed by the broadband camera 120 to recognize the position of the vehicle, in order to continuously update the posture of the vehicle which is being driven. The data processing unit 160 stores the estimated position information of the vehicle in the data unit 195.

The data processing unit 160 uses a 2.5 dimensional road image which is created from a previous image at a time t−1 and a current image at a time t, as an input value to estimate the motion of the broadband camera 120. Here, the 2.5 dimensional road image is a data structure in which three-dimensional distance information which is obtained at the NIR1 channel is combined to the two-dimensional array of the GNF images.

The data processing unit 160 calculates the relative motion T<t−1, t> of the broadband camera for the continuous stereo image frame, with respect to the 2.5 dimensional road image, as follows.

When the two-dimensional image is input, the data processing unit 160 extracts two-dimensional feature points for the images which are obtained at times t−1 and t, that is, for the previous image and the current image, using the SURF algorithm. The data processing unit 160 matches the two-dimensional feature points and creates coincidence point group between the t−1 frame and the t frame. Since the initial matching result may include an error due to erroneous matching, the data processing unit 160 may apply Epipolar geometrical restriction and the RANSAC algorithm to remove outliers.

When the coincidence point group from which the outlier is removed is created, the data processing unit 160 calculates three-dimensional and three-dimensional matching relationship between the time t−1 and the time t using the 2.5 dimensional road image having the depth information and calculates a conversion matrix between two times. When the three dimensional-three dimensional matching relationship is provided, the data processing unit 160 may calculate three-dimensional relative motion T<t−1, t> using a least square fitting method. When the conversion matrix T<t−1, t> between the time t−1 and the time t is determined by a motion estimating process, the data processing unit 160 stores and calculates a conversion matrix Tcw<t> which is moved from a camera coordinate system at the time t to a world coordinate system into the conversion matrix which has been calculated in the previous time.

Accordingly, the data processing unit 160 recognizes the position of the vehicle on the three-dimensional map of the broadband image data based on the broadband camera 120. In some cases, the position may be recognized by the server 2.

As described above, the broadband image creating unit 150 creates the broadband image data based on the depth map of the map creating unit 130 and the GNF image of the image creating unit 140 to create the three-dimensional global map.

In this case, in order to create the three-dimensional global map, the broadband image creating unit 150 stores and manages the information obtained during the motion estimating process of the image frame in accordance with a graph theory in the unit of a node, with respect to the broadband image data.

Whenever the data processing unit 160 estimates the camera motion with respect to the consecutive image, the estimated motion information and distance information are stored in a database. Therefore, one node is allocated for every stereo frame, and the node is configured with one two-dimensional scene and three-dimensional information for that scene.

When the position is recognized based on the broadband camera by the data processing unit 160 and Tcw<t> is determined, a SURF feature point $F_{tk}$ and a three-dimensional world coordinate point $X^W_{t,k}$ corresponding to $F_{tk}$ are stored in a node $N_t$ at the time t, as represented in Equation 4. The three-dimensional world coordinate point $X^W_{t,k}$ is calculated by Equation 5.

$$N_t = \{[F_{t,k}, X_{t,k}^w]\}_{k=1:n} \qquad \text{Equation 4}$$

$$F_{t,k} = [x_{t,k}, \theta_{t,k}, \sigma_{t,k}, d_{t,k}] \qquad \text{Equation 5}$$

In Equations 4 and 5, $F_{t,k}$, $\sigma_{t,k}$, and $d_{t,k}$ indicate a rotation angle of the feature point of the two-dimensional image coordinate, a size of the feature point, and a feature point descriptor of the SURF feature point $F_{t,k}$ corresponding to a k-th time, respectively and $X^c_{t,k}$ indicates a three-dimensional point of the camera coordinate system for $F_{t,k}$.

$$X_{t,k}^w = T_{<t>}^{cw} X_{t,k}^c \qquad \text{Equation 6}$$

$$X_{t,k}^c = I_t^r(x_{t,k}) \qquad \text{Equation 7}$$

The $X_{t,k}^c$ may be obtained by Equation 7, at the two-dimensional image coordinate $x_{t,k}$ and the road image $I^r_t$ at the time t.

The three-dimensional global map is built by the above-described method and the image and the GPS information which are input from the broadband camera 120 in real time are combined to be applied to autonomous driving.

FIG. 13 is a flowchart illustrating a three-dimensional global map creating method according to an exemplary embodiment of the present invention.

As illustrated in FIG. 13, when the broadband camera 120 starts photographing to input a image in step S310, the map creating unit 130 creates a depth map in step S320, and the image creating unit 140 creates a GNF image in step S330.

The broadband image creating unit 150 combines the depth map and the GNF image to create broadband image data in step S340.

In the meantime, the data processing unit 160 creates a 2.5 dimensional structure for the image input from the broadband camera 120, based on the change of the image in accordance with the change of time in step S350. The data processing unit 160 matches a SURF feature point in step S360 and removes outliers using RANSAC in step S370.

The data processing unit 160 calculates a conversion matrix in step S380 and recognizes a position of a vehicle on a three-dimensional map based on the image of the broadband camera 120 in step S390.

The broadband image creating unit 150 recognizes the position of the vehicle from the image which is currently input to create a three-dimensional global map on a three-dimensional map of the broadband image data.

The three-dimensional global map created as described above is used for autonomous driving of the vehicle.

FIGS. 14A, 14B, 15A, 15B, and 16 are exemplary views illustrating a image which is photographed while driving a vehicle and a three-dimensional global map.

Figure 14A:
FIGS. 14A, 14B, 15A, 15B, and 16 are exemplary views illustrating an image which is photographed while driving a vehicle, a broadband image, and a three-dimensional global map.
Figure 14B:

As illustrated in FIG. 14A, with respect to the image input during the autonomous driving of the vehicle, contour of the image is extracted based on the color of the broadband image data as illustrated in FIG. 14B and the image is divided as described above and the database may be built by broadband image data for the three-dimensional map using the depth information.

Figure 15A:
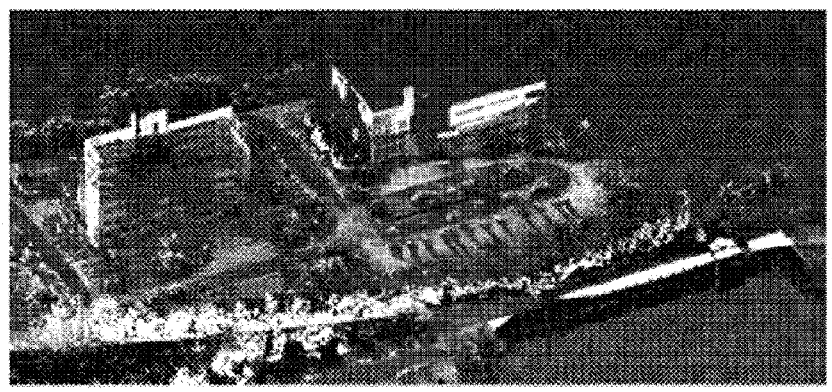
Figure 15B:

Accordingly, as illustrated in FIGS. 15A and 15B, information on the three-dimensional map is stored.

In this exemplary embodiment, the broadband image data is stored in the server 2 to be operated by a cloud method, so that information on a three-dimensional map may be provided to other vehicles, however, an onboard system is also possible. The driving assist system for a vehicle distinguishes asphalt and cement based on the broadband image data and obtains images for a tree or hill in a rural area or an off-road area where no buildings are built.

During the driving of the vehicle, the broadband image creating unit 150 creates the broadband image data from a image input from the broadband camera 120 and the data processing unit 160 estimates the position of the vehicle. The control unit 110 transmits the created broadband image data to the server 2 through the communication unit 190 in real time.

In this exemplary embodiment, the server 2 combines the received data with the broadband image data which has been stored in advance to measure the position of the vehicle and perform map matching. In some cases, the map matching may be performed by the data processing unit 160 of the vehicle 1.

The server 2 transmits the matching information to the vehicle. The above processes are repeated and the vehicle 1 is driven in accordance to the received information. As such, the vehicle 1 may be driven while avoiding detected obstacles.

Figure 16:
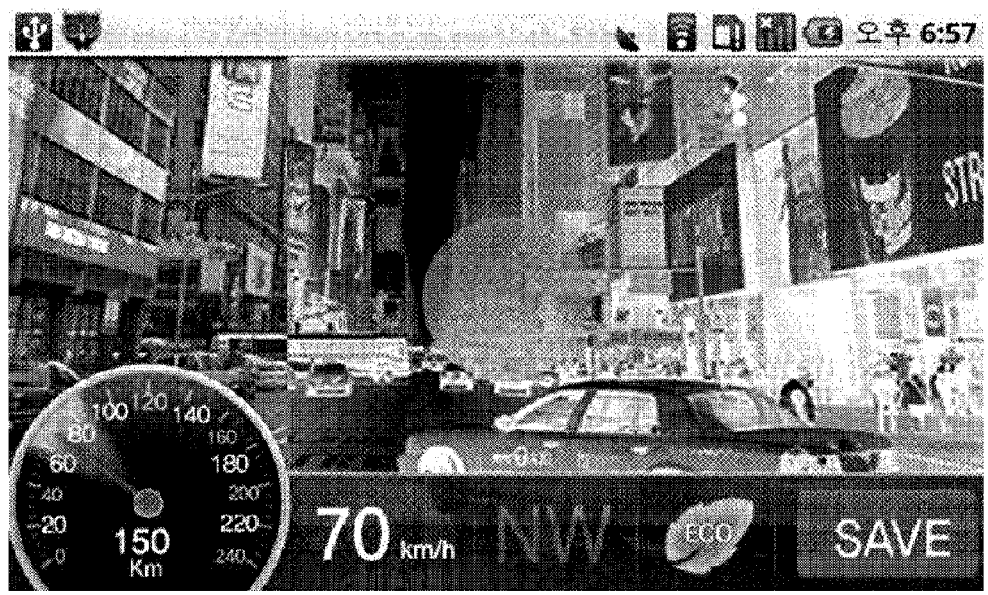

Accordingly, as illustrated in FIG. 16, the vehicle may be autonomously driven through the three-dimensional map information and the position recognition of the vehicle.

According to the exemplary embodiment, four channel color information may be obtained from the image of the broadband camera 120 to recognize the road and detect obstacles without other additional devices. Further, a three-dimensional map is created based on the image of the broadband camera 120 and the position of the vehicle may be matched to be applied to autonomous driving.

According to a driving assist system for a vehicle and a method thereof according to the present disclosure, a road and an obstacle are easily recognized using a minimal number of cameras while driving a vehicle, the recognization performance of a drivable area is significantly improved, navigation for a vehicle is easily measured, and the biometric recognizing function of a driver monitoring camera is improved, thereby improving the convenience of a driver by improving the performance of a driving assist device.

The word "comprise", "configure", or "have" used in the above description will be understood to imply the inclusion of stated elements unless explicitly described to the contrary, so that the word will be interpreted to imply the inclusion of stated elements but not the exclusion of any other elements.

Preferred embodiments of the present disclosure have been illustrated and described above, but the present disclosure is not limited to the above-described specific embodiments, it is obvious that various modifications may be made by those skilled in the art, to which the present disclosure pertains without departing from the gist of the present disclosure, which is claimed in the claims, and such modifications should not be individually understood from the technical spirit or prospect of the present disclosure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A driving assist system for a vehicle, comprising:
an 800 nm-band near infrared (NIR1) projector;
a single broadband camera configured to photograph the surroundings of the vehicle to generate an image, wherein the image generated by the broadband camera comprises four channels of light information consisting of green, 800 nm-band near infrared 1 (NIR1), 900 nm-band near infrared 2 (NIR2), and fast infrared (FIR) channels;
a map creating unit configured to create a depth map based on the image from the single broadband camera;
an image creating unit configured to create a green, near infrared, and far infrared ("GNF") image based on the image from the broadband camera; and
a broadband image creating unit configured to create broadband image data for a three-dimensional map from the depth map and the GNF image,
wherein the image generated by the single broadband camera comprises at least one channel of light information, each of the at least one channel of light information being different from any others, and
wherein the map creating unit is configured to calculate depth information based on a trigonometric relationship of an extracted pattern of infrared light emitted from the NIR1 projector to be incident onto the broadband camera and received through the NIR1 channel of the broadband camera in the image and a stored pattern from a reference plane.

2. The driving assist system for a vehicle of claim 1, wherein the map creating unit is configured to distinguish an object in the image based on light information of green, 900 nm-band near infrared 2 (NIR2), and the far infrared FIR comprising the image.

3. The driving assist system for a vehicle of claim 2, wherein the map creating unit is configured to distinguish an object according to differences in the light wavelengths of green, the 900 nm-band near infrared 2 (NIR2), and the far infrared FIR.

4. The driving assist system for a vehicle of claim 1, wherein the image creating unit is configured to create the GNF image based on light information of the green, 900 nm-band near infrared 2 (NIR2), and far infrared FIR channels.

5. The driving assist system for a vehicle of claim 1, wherein the broadband image creating unit is configured to combine the depth map from the map creating unit and the GNF image to create broadband image data for use as a template in a three-dimensional map and create a three-dimensional global map from the broadband image data.

6. The driving assist system for a vehicle of claim 5, wherein the broadband image creating unit is configured to highlight a contour of the GNF image using canny edge detection to distinguish an object region.

7. The driving assist system for a vehicle of claim 1, further comprising:
an obstacle detecting unit configured to detect an obstacle from the broadband image data, wherein the obstacle detecting unit models an object included in the broadband image data and distinguishes the obstacle based on distance information.

8. The driving assist system for a vehicle of claim 7, wherein the obstacle detecting unit is configured to:
set other regions excluding a road region from the broadband image data as an obstacle region; and
set the obstacle region as an interest region to detect an obstacle only from the interest region.

9. The driving assist system for a vehicle of claim 8, wherein the obstacle detecting unit is configured to track movement of the object in the interest region to determine whether the movement of the object is the obstacle entering the road region.

10. The driving assist system for a vehicle of claim 1, further comprising:
a data processing unit configured to estimate the relative motion of the camera with respect to a consecutive image which is photographed by the broadband camera to determine the position of the vehicle and continuously update the posture of the vehicle while driving.

11. The driving assist system for a vehicle of claim 10, wherein the data processing unit is configured to extract and match feature points from a previous image at a time t−1 and a current image at a time t from the image and calculate a three-dimensional matching relationship based on the depth information to calculate a conversion matrix between the time t−1 and the time t to estimate the position of the vehicle.

12. The driving assist system for a vehicle of claim 8, further comprising:
a communication unit configured to transmit broadband image data created from the broadband image creating unit to a server; and
a control unit configured to transmit and receive data to and from the server through the communication unit to combine the broadband image data and GPS information to control the driving of the vehicle.

13. An operating method of a driving assist system for a vehicle, comprising:
projecting an 800 nm-band near infrared 1 (NIR1) pattern with a NIR1 projector;
inputting an image comprising four channels of light information obtained by a single broadband camera, wherein the four channels of light information consist of green, 800 nm-band near infrared 1 (NIR1), 900 nm-band near infrared 2 (NIR2), and fast infrared (FIR) channels;
creating a depth map from the image obtained by the single broadband camera based on the four channel information;
creating a green, near infrared, and far infrared (GNF) image from the image; and
combining the depth map and the GNF image to create broadband image data,
wherein depth information of the depth map is calculated based on a trigonometric relationship of an extracted pattern of infrared light emitted from the NIR1 projector to be incident onto the broadband camera and received through the NIR1 channel of the broadband camera in the image and a stored pattern from a reference plane.

14. The operating method of claim 13, further comprising:
detecting an obstacle from the broadband image data.

15. The operating method of claim 13, further comprising:
estimating the position of a vehicle to match the broadband image data.

16. The operating method of claim 15, further comprising:
extracting feature points of a previous image and a current image in accordance with a change of time from the image generated by the broadband camera; and
estimating the position of the vehicle by calculating a matching relationship for the feature points based on depth information to calculate a conversion matrix between the previous image and the current image.

* * * * *